United States Patent

Altenburger

[15] 3,671,678

[45] June 20, 1972

[54] RINGING CONTROL CIRCUIT

[72] Inventor: Otto Altenburger, Rochester, N.Y.

[73] Assignee: Stromberg-Carlson Corporation, Rochester, N.Y.

[22] Filed: Dec. 22, 1970

[21] Appl. No.: 100,647

[52] U.S. Cl. ........................................179/18 HB, 179/84 R

[51] Int. Cl. ........................................................H04m 3/02

[58] Field of Search....................................179/18 HB, 84 R

[56] References Cited

UNITED STATES PATENTS 3,059,058 10/1962 Abbott ..............................179/18 HB 3,492,436 1/1970 Feiner et al........................179/18 HB

*Primary Examiner*—William C. Cooper

*Attorney*—Craig, Antonelli, Stewart & Hill

[57] ABSTRACT

A ringing control circuit is provided in each terminating line between the trunk link network and the line link network so that once a path to the terminating line circuit is established, the ringing control is automatically available as a result of its being a part of this connection. In addition, a splash ring circuit in the ringing control provides for an immediate ring of the terminating line circuit as soon as the path is established thereto.

20 Claims, 4 Drawing Figures

Figure 1:
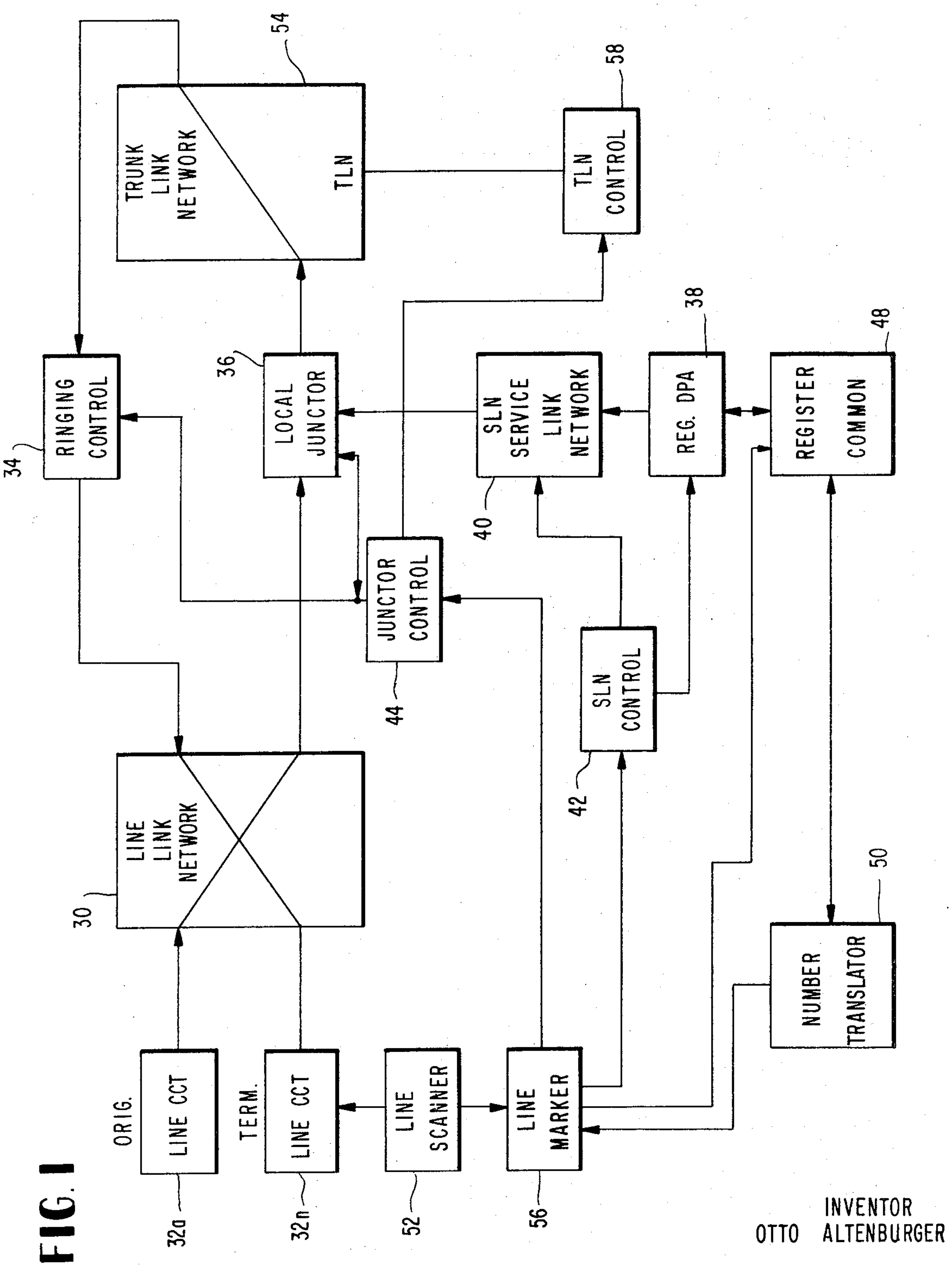

INVENTOR
OTTO ALTENBURGER

BY Craig, Antonelli, Stewart & Hill
ATTORNEYS

RINGING CONTROL CIRCUIT

The present invention relates in general to automatic telephone systems of the common control type, and more particularly to a ringing control circuit for use in connection with a common control automatic telephone system.

One of the principal advantages of a common control telephone system is the ability to provide service equipment on a time-share basis. In this way, a reduction in equipment is made possible since equipment which is needed to establish a connection between a calling and called party can be released once the connection is established so as to be available for use in establishing other calls. In such systems, equipment is accessed as it is needed and is released as soon as it has performed its function. For this purpose, control equipment must be provided in the system to determine the availability of the various time-shared circuits and access these circuits as they are needed in connection with the establishment of a call.

Thus, while a great saving is accomplished in connection with common control systems in the provision of equipment for controlling the establishment, maintenance and release of a communication connection between parties, there is also involved in such systems the added cost for provision of accessing and selection circuits in connection with the time-shared supervisory equipment. In most cases, the savings involved in providing only a relatively small number of any given type of circuit to handle the calls in connection with a large number of line circuits far exceeds the costs involved in providing access and selection equipment in association with these common circuits. However, for certain circuits, such as ringing control circuits, which are relatively inexpensive and are used for all terminating connections within the exchange, it is often more advantageous to provide a plurality of such circuits on a non-time-shared basis. The result is elimination of access and selection equipment in connection with such circuits, which not only provide a saving in the cost of the equipment but also serves to provide a more rapid availability of the functions provided by such a circuit. In the case of a ringing control, this is especially important since it makes possible a more immediate application of ringing to the called line circuit, thereby reducing the overall time for establishment of a call.

There is provided in accordance with the present invention in a common control automatic telephone system an individual ringing control in each terminating path between the trunk link network and the line link network, so that selection of a terminating path through the trunk link network to the called line circuit automatically produces selection of a ringing control, thereby avoiding the need for special access and selection equipment to provide a ringing control after the path to the called line circuit has been established. This is in contrast to prior known systems wherein a path was first established between a local or terminating junctor through a link network to the called line circuit before a ringing control was selected and connected through the junctor to the called line circuit. This required the provision of special selection equipment for accessing the ringing control and connecting it to the junctor subsequent to the establishment of a path through the link networks to respective line circuits.

The ringing control in accordance with the present invention also provides various advantageous features in connection with the application of ringing to the respective parties. One of these features provides for the application of a splash ring to the called line circuit immediately upon connection thereto irrespective of the signal received from the interrupter in the ringing control. Thus, as soon as connection is established to the called line circuit, the telephone of the called party will ring immediately even though such connection occurs during the normal pause or interrupt period in the ringing control cycle.

Another feature of the invention relates to the ability of an operator to automatically effect a premature trip for purposes of busy verification of a line circuit. In the case where an operator wishes to monitor the line circuit by connection thereto to determine that the line circuit is busy, and is not malfunctioning, the system provides for a premature ring trip in the ringing control to prevent the application of ringing to the party whose line circuit is being monitored. Obviously, in such a situation, the monitoring of the line circuit should be carried out without applying ringing to the telephone which is being monitored thereby unnecessarily annoying or inconveniencing the subscriber.

Another feature of the present invention provides for the automatic connection of a metering pulse to the calling line circuit in connection with business calls where answer supervision is desired. By providing a particular class of service for the calling party for which answer supervision is required, the ringing control in accordance with the present invention automatically applies a metering pulse on the sleeve lead to the calling line circuit in response to detection of ring trip, indicating that the called party has answered and the connection has been established.

Thus, it is an object of the present invention to provide an automatic telephone system of the common control type wherein the ringing control will be immediately available upon completion of the connection to the called party line circuit.

It is another feature of the present invention to provide a ringing control circuit which provides for an immediate ring of the called party equipment at the time of connection thereto whether or not such connection occurs during a normal ringing period.

Figure 2:
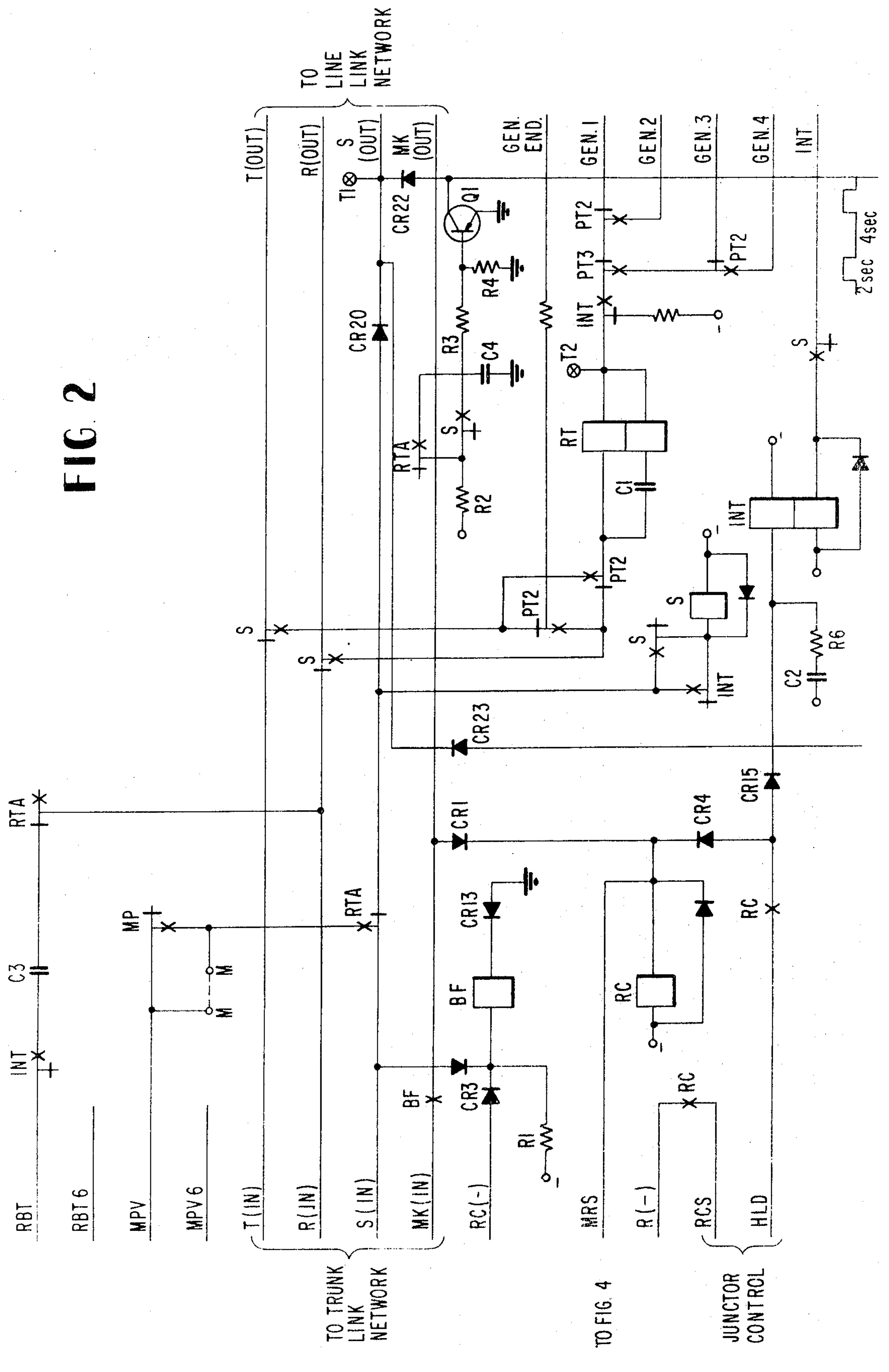
Figure 3:
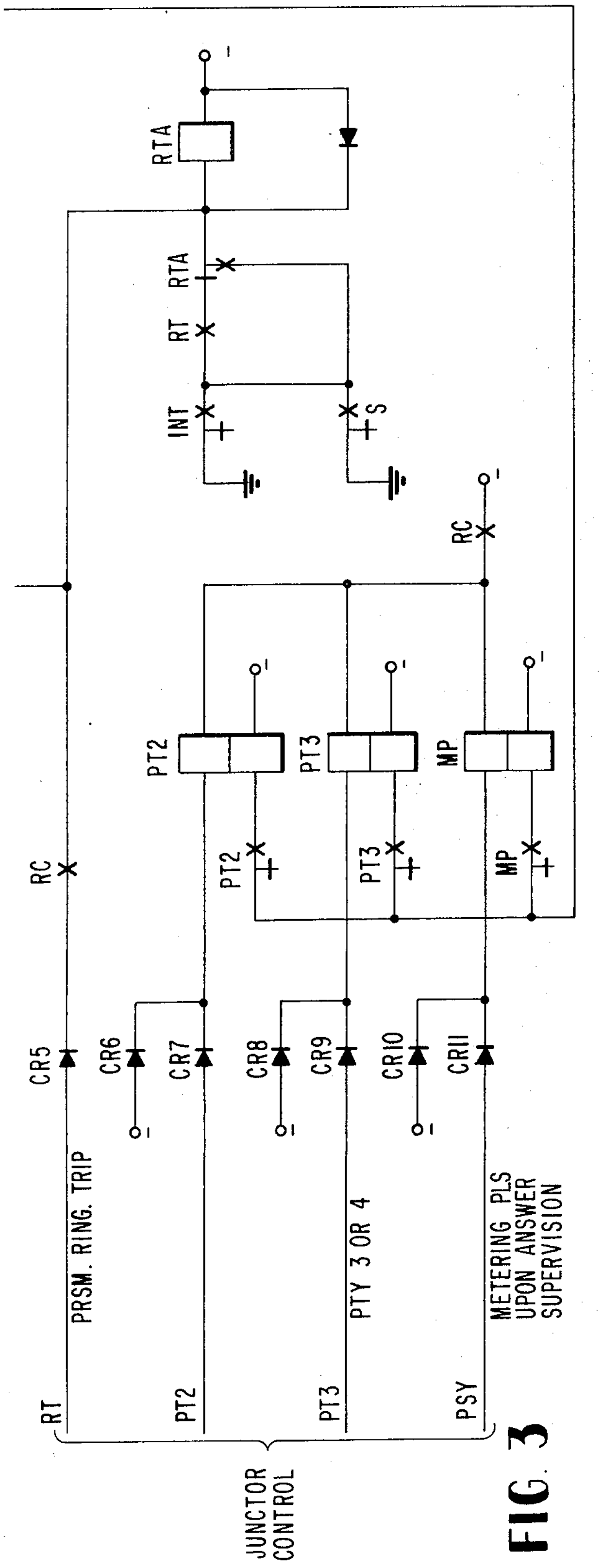
Figure 4:
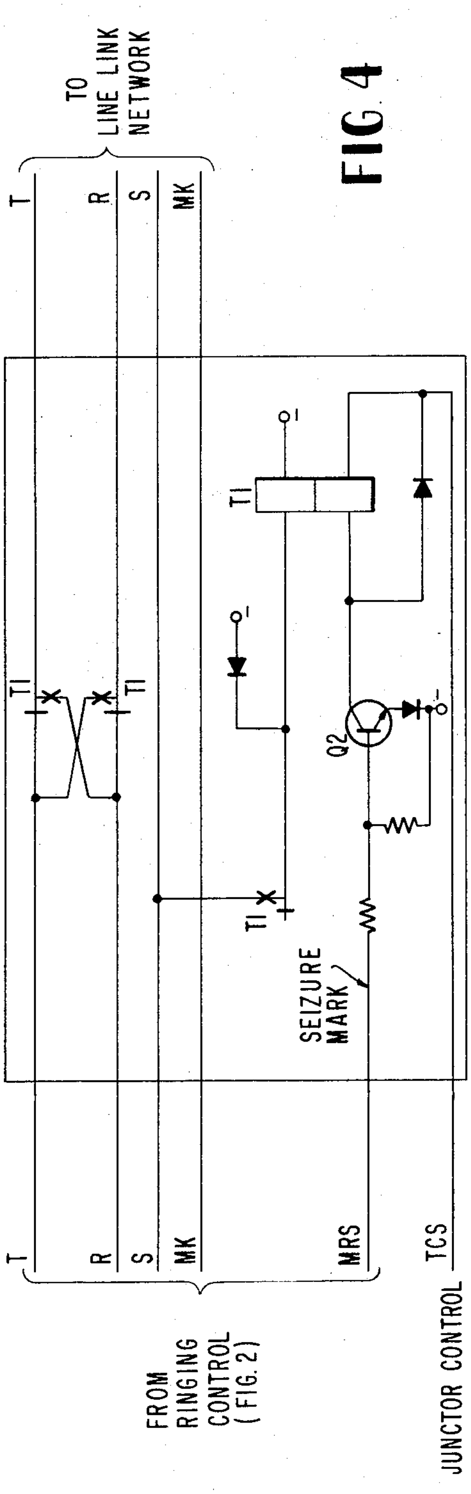

These and other objects, features and advantages of the present invention will become more apparent from the following detailed description thereof when taken in conjunction with the accompanying drawings, wherein:

FIG. 1 is a schematic block diagram of an automatic common control telephone system including the ringing control of the present invention;

FIGS. 2 and 3, when combined, provide a schematic circuit diagram of a ringing control in accordance with the present invention; and FIG. 4 is a schematic circuit diagram of a ringing control adaptor for use in connection with the present invention.

For purposes of describing the various features of the present invention, an exemplary common control telephone system will be described in association with the ringing control circuit of the present invention; however, it should be understood that telephone systems of the common control type other than the specific system disclosed herein may be utilized with the present invention.

GENERAL SYSTEM DESCRIPTION

The telephone system illustrated in FIG. 1 includes a line link network (LLN) 30 which functions as a concentrator for originating calls and a fan-out for terminating calls. The line link network 30 may, for example, consist of three stages of matrices, and is used for both originating and terminating connections for a plurality of line circuits 32*a*–32*n*, which vary in number depending upon the size and expected traffic to be handled by the system. The inputs to the first stage of the line link network 30 are connected to the line circuits 32*a*–32*n* and the outputs of the last stage of the line link network 30 provide terminations for originating traffic to the local junctors 36, and in accordance with the present invention, provide for connection of terminating traffic from the output stage of the trunk link network (TLN) via a ringing control 34. In accordance with the present invention, a ringing control 34 is provided in each link between an output of the trunk link network 54 and a last stage termination of the line link network 30. The number of local junctors provided depends upon the traffic requirements of the system.

The local junctors 36 serve as the connection circuits for all originating traffic, providing for connecting of calling line circuits to a register (dial pulse acceptor) DPA 38 via the service link network (SLN) 40 so as to provide dial tone to the originating line circuit and permit reception of the dial impulses or multi-frequency tones from the calling subscriber subsequent thereto. The local junctor 36 provides transmission battery for both the calling and the called parties on intra-office calls. In addition, when trunk or station-busy conditions are encountered, the local junctors 36 provide the busy tone to the calling party. These junctors are described more fully in my copending application, Ser. No. 100,571, filed Dec. 22, 1970.

The service link network 40 includes, for example, two stages of matrices, and is controlled by a SLN control circuit 42 which controls the selection of a path through the service link network 40 between a local junctor 36 and the register DPA 38.

Each register DPA 38 may consist of a dial pulse acceptor, register storage and register output, and can be connected to a register sender for providing outpulsing. The register DPA 38 is controlled by a register common 48 on a time-division multiplex basis. The register common 48 is also connected to a number translator 50, which provides equipment numbers for the various line circuits and class of service information.

A line scanner 52 continuously checks the line circuits 32*a*–32 for an off-hook condition and also is used for control of terminating connections. In the case of originating traffic, the line scanner stops when an off-hook condition is detected and transmits the information from its counter circuits to a line marker 56 to mark the particular line circuit and enable the SLN control 42 to initiate connection of the particular line circuit to a register DPA 38. In the case of terminating traffic, the line scanner 52 receives an equipment number from the number translator 50 and then causes the marker 56 to mark the particular line circuit having that number so that connection can be effected from the local junctor 36 through the trunk link network 54, a ringing control 34 and the line link network 30 to the terminating line circuit. In addition, for terminating connections, the line scanner 52 and marker 56 also serve to transmit the terminating subscriber class of service, ringing code, busy or idle condition, and types of ringing required from the number translator 50 to the junctor control 44, which serves to control the local junctor 36, the ringing control 34 and the TLN control 58. The line scanner and line marker are more fully described in copending application, Ser. No. 101,091, filed Dec. 23, 1970, in the names of Otto Altenburger and Gunter F. Neumier.

In operation, when a telephone goes off-hook, the line scanner 56 detects the off-hook condition and marks the line circuit connection to the first stage of the line link network 30. Simultaneously, the line marker circuit signals the SLN control 42 to begin its control operation for connecting the marked line circuit to a register DPA 38 through a local junctor 36 and the service link network 40. When a free path between the line circuit requesting service and the register DPA 38 has been found, the selected matrix relay coils in the line link network 30 and the service link network 40 are energized to complete the connection. At this time the SLN control 42 and line scanner circuit 56 are released and the register DPA 38 returns dial tone to the subscriber and awaits receipt of dialed information. Once the subscriber information has been dialed into the register DPA 38, the call must be routed either internally to another local subscriber or externally to another exchange.

The trunk link network 54 provides for the termination of the local traffic to the local subscribers. The inputs to the first stage of the trunk link network 54 are connected to the local junctors 36 and to trunk junctors (not shown) which serve incoming calls from other exchanges. The outputs from the last stage of the trunk link network are connected to outgoing trunk circuits for calls extending from the exchange to other exchanges, and for local calls certain outputs provide for connection through a ringing control 34 to the line link network 30. In the case of a call terminating to a local subscriber, the number translator 50 marks the called line circuit via the line scanner 52 and marker 56. A path-finding operation through the trunk link network 54 is then performed under control of the junctor control 44 and TLN control 58, and in the process of selecting a path through the trunk link network 54, a ringing control 34 is automatically selected since each link between the output of the trunk link network 54 and the line link network 30 includes an individual ringing control 34.

After a path has been found through the trunk link network 54 and before the cross-points therein are operated, the ringing code for the terminating line circuit is provided from the number translator 50 through the line scanner 52, marker 56 and junctor control 44 to the ringing control 34 associated with this call. The cross-points in the trunk link network 54 are then operated and ringing is immediately applied from the ringing control 34 through the line link network 30 to the called line circuit and ring-back is applied to the calling line circuit. The common circuits involved in the establishment of the call are then released, and once the called party responds to the ringing, a communication connection is established between the line circuits via the line link network 30, local junctor 36, trunk link network 54 and ringing control 34. The connections through the line link network 30 and the trunk link network 54 are maintained during the call under the control of the calling party. When the calling party hangs up, all the connections are broken. In the event that the calling party still remains off-hook after the called party hangs up, provisions are included in the local junctor 36 for breaking of the connections after a pre-set period of time.

RINGING CONTROL CIRCUIT

Reference is now made to FIGS. 2 and 3, which together provide a schematic circuit diagram of the ringing control in accordance with the present invention. As can be seen from FIG. 2, the ringing control is designed for use in connection with four wire systems, including tip T and ring R leads for establishing the communication path between line circuits, the sleeve lead S being provided for holding the cross-points through the line link network 30 and trunk link network 54, and the mark lead MK providing the means for finding a path through the line link network 30 and trunk link network 54, for example, by any well known end-to-end or other marking scheme. For purposes of establishing a terminating path from a local junctor 36 to a terminating line circuit, the line circuit is marked from the line scanner 52 and the local junctor 36 is marked under control of the junctor control 44. The trunk link network control 58 then seeks out a path through the trunk link network 54 which will connect through a ringing control 34 and the line link network 30 to the terminating line circuit. For the purpose of this path-finding operation, it should be noted that the mark from the local junctor 36 extends not only through the trunk link network 54 but also through the ringing control 34, so that the availability of the ringing control circuit and its access for purposes of providing ringing to the terminating line circuit is accomplished automatically during the path-finding to the terminating line circuit.

The ringing control circuit includes a busy-free relay BF having a contact in the mark lead MK. This relay is normally operated from negative potential through a resistor R1, the winding of the relay, diode CR 13 and ground. Thus, the mark lead MK provides a conductive path from the output of the trunk link network 54 through the ringing control at all times during which the ringing control is available.

The ringing control circuit also includes a ringing control relay RC which enables the other control relays in the circuit at the time that the circuit is acquired during the path-finding operation.

A sleeve relay S is also provided which operates from the holding ground provided from the sleeve lead S at the time a path is established to the terminating line circuit and serves to connect the ringing circuitry to the tip T and ring R leads so that ringing current can be applied to the terminating line circuit.

An interrupt relay INT is provided which serves to interrupt the application of ringing current to the terminating line circuit to provide the necessary pauses between ringing conventionally provided. The relay also serves to effect connection of ring-back tone to the originating line circuit.

The ring trip relay RT monitors the condition of the line to the terminating line circuit and is operated when the called subscriber goes off-hook completing the d.c. loop to the relay. Operation of the ring trip relay RT initiates the sequence which results in disconnection of the ringing generator from the terminating line circuit and ring-back tone from the originating line circuit.

The ring trip actuate relay RTA is enabled by the ring trip relay RT, opens the operate path to he sleeve relay S, which in turn produces release of the other relays and disconnects the ringing generator from the tip T and ring R leads to the terminating line circuit.

The party relays $PT_2$ and $PT_3$ are provided to identify the ringing code for party-line circuits and are capable by their selective operation of controlling the application of one of four different ringing signals to the terminating line circuit. These relays are controlled from the junctor control in response to information received via the line scanner 52 and marker 56 from the number translator 50.

The metering pulse relay MP, when actuated from the junctor control, serves to enable the application of a positive voltage on the sleeve lead to the originating line circuit at the time of ring trip to provide for answer supervision.

The operation of the ringing control circuit in accordance with the present invention will clearly indicate the advantages which may be derived from this particular circuit arrangement. When the ringing control is idle, the busy-free relay BF will be operated thereby maintaining a circuit connection on the mark lead MK through the ringing control. On seizure of the ringing control along with detection of a complete path through the trunk link network 54, a ground will be applied to the MK (in) lead which will extend via diode CR1 to the ringing control relay RC to operate this relay. A continuity check of the path through the trunk link network and line link network is then performed by the junctor control and once a complete path is detected, ground will be applied to the sleeve lead S (in) causing the busy-free relay BF to release, there being ground applied to both sides of the operate winding thereof. Release of the busy-free relay BF opens the mark lead MK marking the ringing control circuit busy.

The ringing control relay RC once operated, locks through its own contacts due to ground applied from the junctor control on line HLD via diode CR4. This same ground on line HLD is applied to one winding of the interrupt relay INT via diode CR15 which operates the interrupt relay. At this time, the capacitor C2 is charged from the ground on the lead HLD through the resistance R6.

The ground applied to the sleeve lead S to hold the crosspoints in the trunk link network 54 is now applied through the contacts of the interrupt relay INT to the sleeve relay S, which operates and locks over its own contacts to the ground applied on the sleeve lead. The interrupt relay INT will then be released by removal of ground from the line HLD but the sleeve relay S will remain operated over its own contacts thereby connecting the second winding of the interrupt relay INT to an interrupt generator which provides interrupted ground pulses to the interrupt relay, rendering the relay alternately on for 2 seconds and off for 4 seconds.

Once the ringing control circuit has been acquired and the ringing control relay RC has been actuated therein, the ringing code for the particular terminating line circuit is supplied from the number translator 50 via the line scanner 52, marker 56 and the junctor control 44 to the ringing control and is received, if necessary, at one or both of the input lines PT2 and PT3. If the terminating line circuit represents only a single party circuit, no ringing code is required and neither relay PT2 or PT3 is actuated. If the terminating line circuit is a two-party line circuit, a ground will be applied to the line PT2 to actuate the relay PT2 through the contacts of the ringing control relay RC. If the terminating line circuit is a three-party line circuit, ground will be applied to the line PT3 to operate the relay PT3 through the contacts of the ringing control relay RC. If the terminating line circuit is a four-party line circuit, ground will be applied to both leads PT2 and PT3 to operate both of the relays connected to these lines. The relays PT2 and PT3, if operated, will lock through their own contacts due to ground applied from the transistor Q1. Upon operation of the sleeve relay S, negative potential is applied through resistor R2, the contact of the sleeve relay S and the resistor R3 to the base of transistor Q1, which turns on the transistor. Ground is then applied both to the S (out) lead via diode CR22 and to the holding circuits for the relays PT2 and PT3. While the sleeve relay S is operated, the capacitor C4 connected in the base circuit of the transistor Q1 is charged from negative potential. The function of the capacitor C4 will be described below.

With the interrupt relay INT operating for 2 seconds out of each 6-second interval, ringing current from one of the generators GEN1 through GEN4 will be applied through the contacts of the interrupt relay, the windings of the ring trip relay RT and the contacts of the sleeve relay S to the tip T and the ring R leads extending to the terminating line circuit. Since the ringing current passes through both windings of the ring trip relay RT, this relay will not operate in response thereto. However, due to the presence of the capacitor C1 connected to one of the windings of the ring trip relay, the creation of a d.c. loop to the terminating line circuit by the called subscriber going off-hook will create an imbalance in the current through the ring trip relay causing it to operate.

The periodic operation of the interrupt relay INT also serves to connect ring-back tone to the originating line circuit via capacitor C3 connected to the ring lead R (in). Thus, with successive operation of the interrupt relay from the interrupt generator via the closed contacts of the sleeve relay S, ringing current from one of the ringing generators, depending upon the ringing code determined by the condition of the relays PT2 and PT3, will provide for application of ringing current to the terminating line circuit and simultaneous application of ring-back tone to the originating line circuit.

A particularly advantageous feature of the present invention is derived from the capacitor C2 which is connected to the interrupt relay INT. As already indicated, this capacitor is charged at the time that ground is connected to the line HLD from the junctor control which also operates the INT relay. At the time that the sleeve relay S is operated from ground applied to the sleeve lead S (in) via an INT contact and ground is removed from the line HLD, the capacitor C2 discharges through one winding of the INT relay causing it slowly to release. Relay S operated connects one of the ringing generators to the terminating line circuit so as to provide an instantaneous splash ring whether or not the interrupt relay would have been operated by the interrupted ground pulses provided from the interrupt generator. In other words, if the interrupt generator connected to the interrupt relay provides the 4-second off period at the time the ringing control is connected to the terminating line circuit, the interrupt relay will be actuated anyway, due to discharge of the capacitor C2, so that an instantaneous ring is generated at the terminating line circuit upon connection thereto. This arrangement provides for a more instantaneous completion of the call to the terminating line circuit.

For purposes of providing answer supervision in connection with business calls, for example, the ringing control circuit provides for application of a metering pulse in the form of a positive voltage from line MPV on the sleeve lead to the originating line circuit, once ring trip is detected. The need for answer supervision is provided from the number translator 50 as a class of service indication via the line scanner 52, marker 56 and junctor control 44 in the form of a ground applied to the lead BSY to operate the metering pulse relay MP. This relay locks through its own contacts from the ground applied at the collector of transistor Q1 in the same manner as the relays PT2 and PT3. With the metering pulse relay MP actuated, the metering pulse in the form of a positive voltage will be applied along the sleeve lead to the originating line circuit as soon as the relay RTA is actuated. When the called party goes off-hook, relay RT will operate during the silent period as well as during the ringing period. This completes the circuit to the relay RTA through the closed contacts either of the interrupt relay INT or the sleeve relay S. Operation of the relay RTA, which locks through its own contact to ground, opens the hold path to the sleeve relay S from the sleeve lead S (in). At the same time, the path from the ring-back generator on line RBT is opened to remove ring-back tone from the originating line circuit. As indicated above, operation of this relay also serves to connect the metering pulse to the sleeve lead back to the originating line circuit.

The release of the sleeve relay S provides tip and ring switch-through, thereby interconnecting the originating and terminating line circuits on the tip T and ring R leads and simultaneously opens the ringing generator leads to cut off ringing current to the terminating line circuit. With release of the sleeve relay S, the interrupt relay INT also releases and the negative potential source is removed from the base of transistor Q1, which eventually will become non-conductive, thereby releasing all of the relays PT2, PT3 and MP.

The capacitor C4 connected in the base circuit of the transistor Q1 is charged at the time the sleeve relay S is initially actuated. This capacitor serves to maintain the transistor Q1 in the conductive state subsequent to release of the sleeve relay S, so as to maintain the cross-points in the switching network closed until it is sure that ringing current has been removed from the tip T and ring R leads where the originating subscriber releases before completion of the call to the terminating line circuit. Thus, if the calling party should disconnect during ringing and prior to ring trip, ground will be removed from the S (in) lead; however, to assure that the cross-points will not open while ringing current is being applied therethrough, a condition which would cause damage to the contacts, the cross-points are held for a time subsequent to release of the sleeve relay S by discharge of the capacitor C4 maintaining the transistor Q1 in a conductive condition wherein ground is applied to the sleeve lead S.

In the case where the operator wishes to monitor a line circuit for busy verification, provision is made for effecting a premature ring trip of the ringing control so as to permit the operator to monitor the line circuit by connection thereto without effecting a ringing of the subscriber. On a call from the operator for purposes of determining whether a line is operating properly, ground is applied to the ring trip lead RT through the contacts of the operated ring control relay RC to the relay RTA to effect operation of this relay even though the ring trip relay RT is not operated. Connection is then established via the tip lead T and ring lead R to the line circuit from the operator without effecting a ringing of the line circuit. In this way, the subscriber is undisturbed by the monitoring of the line circuit.

The junctor control also provides a ground on the lead RCS in the ringing control which is extended at the time of operation of the ring control relay RC on line R to a ringing control identity circuit, which serves to identify the ringing control which is associated with a particular call. For example, if some difficulty is encountered in the establishment of a connection through the trunk link network 54 or line link network 30, the location of the fault will be facilitated by identification of the ringing control circuit which is associated with the attempted connection. The ringing control identity is determined by the detection of ground on the R lead. Testing of the ringing control can also be effected by application of ground to the lead RC which releases the busy-free relay BF. For this purpose, ground is applied to all ringing control circuits, except the one which is desired to be tested, so that only the single ringing control can be operated and will be accessed during the establishment of a connection through the trunk link network 54.

The particular ringing control illustrated in FIGS. 2 and 3 will accommodate a line circuit capable of accommodating up to four parties. However, if a larger number of parties is assigned to a given line circuit, the number of ringing codes can be increased through use of a ringing control adaptor of the type illustrated in FIG. 4. For this purpose, each ringing control may be provided with an individual adaptor which is actuated from the lead MRS, connected to the ringing control relay RC in the ringing control. At the time the ringing control relay RC is actuated from the ground applied to the mark lead, the ground is also extended on the lead MRS to the adaptor and serves to actuate the transistor Q2 therein. If a proper class of service from the number translator 50 indicates that the line circuit accommodates more than the four parties, ground is applied to the lead TCS in the adaptor completing the circuit through one winding of the relay T1 with operation of the transistor Q2. The relay T1 locks over its own contacts connected to the ground applied from the sleeve lead S and serves to reverse the tip T and ring R leads so as to reverse the potential of the ringing signal from the ringing generators connected thereto by the periodic operation of the interrupt relay INT in the ringing control. In this way, up to eight ringing codes are available with the four ringing code generators and the designation of the parties 4 through 8 is effected through selective operation of the relays PT2 and PT3 in the same manner as parties 1 through 4, with the exception that for parties 5 through 8, the relay T1 is operated to reverse the polarity of the tip and ring leads.

Thus, it can be seen that the present invention greatly simplifies the overall telephone system by providing the ringing control directly in the connection between the trunk link network and the line link network for terminating connections, thereby avoiding the need for selection and accessing circuits for the ringing controls. In addition, as soon as the terminating path is established to the terminating line circuit, ringing is immediately applied to that line circuit, since the ringing control already forms a part of this connection and the splash ring circuit in the ringing control immediately operates the interrupt relay INT to connect a ringing generator to the terminating line circuit. Special features relating to busy verification and answer supervision are also automatically provided by this ringing control in a simplified manner and monitoring and testing of the functioning of the ringing control is facilitated by the circuitry thereof.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. In an automatic telephone system including a plurality of line circuits, a multi-stage line link network having a first stage connected to said line circuits, a multi-stage trunk link network, at least one junctor for connecting selected outputs from the last stage of said line link network to an input of the first stage of said trunk link network, a plurality of lines connecting selected outputs from the last stage of said trunk link network to selected inputs to the last stage of said line link network, and common control means for controlling said line link network and said trunk link network in response to dialed information from an originating line circuit to provide a communication connection from said originating line circuit through said line link network, said junctor, said trunk link network, one of said plurality of lines, and back through said line link network to a terminating line circuit, the improvement comprising a plurality of ringing control circuits each connected permanently in a respective one of said plurality of lines connecting selected outputs from the last stage of said trunk link network to selected inputs to the last stage of said line link network to apply ringing signals to said terminating line circuits upon connection thereto.

2. An automatic telephone system as defined in claim 1, wherein said communication connections through said line link network and said trunk link network and said plurality of lines each include tip, ring, sleeve and mark leads, the path through these networks being determined by marking on the mark lead and being established by connecting ground to the sleeve lead, each ringing control circuit including a normally operated busy-free relay having contacts in said mark lead, said busy-free relay being connected to said sleeve lead so as to be released by the connection of ground thereto, thereby opening said mark lead to busy said ringing control.

3. An automatic telephone system as defined in claim 2, wherein each ringing control circuit includes at last one ringing generator providing a ringing signal, connecting means for selectively connecting said ringing generator across said tip and ring leads, interrupting means for selectively connecting said ringing generator to said connecting means and interval control means for actuating said interrupting means periodically for given time periods separated by intervals.

4. An automatic telephone system as defined in claim 3, wherein each ringing control circuit further includes splash ring generating means responsive to operation of said connecting means for actuating said interrupting means independently of said interval control means only for a single time period.

5. An automatic telephone system as defined in claim 4, wherein said ringing generator in each ringing control circuit is selectively connected by said interrupting means to said tip and ring leads through ring trip relay means responsive to connection across said tip and ring leads for disconnecting said interval control means from said interrupting means.

6. An automatic telephone system as defined in claim 1, wherein each ringing control circuit includes at least one ringing generator providing a ringing signal, connecting means for selectively connecting said ringing generator to one of said line circuits, interrupting means for selectively connecting said ringing generator to said connecting means, interval control means for actuating said interrupting means periodically for given time periods separated by intervals, and splash ring generating means responsive to operation of said connecting means for actuating said interrupting means independently of said interval control means only for a single time period.

7. An automatic telephone system comprising a plurality of line circuits, a multi-stage line link network having a first stage including a plurality of inputs connected to said line circuits and a last stage having a plurality of inputs and a plurality of outputs, a multi-stage trunk link network having a last stage including a plurality of outputs, a plurality of lines connecting the outputs from the last stage of said trunk link network to the inputs to the last stage of said line link network, a plurality of ringing control circuits each connected permanently in a respective one of said plurality of lines, and common control means for controlling said line link network and said trunk link network to effect connection of an input of the first stage of said trunk link network to one of said line circuits through one of said plurality of lines and said line link network.

8. An automatic telephone system as defined in claim 7, wherein communication connections through said line link network and said trunk link network and said plurality of lines each include tip, ring, sleeve and mark leads, each ringing control circuit including at least one ringing generator providing a ringing signal, connecting means for selectively connecting said ringing generator across said tip and ring leads, interrupting means for selectively connecting said ringing generator to said connecting means, and interval control means for actuating said interrupting means periodically for given time periods separated by intervals.

9. An automatic telephone system as defined in claim 8, wherein each ringing control circuit further includes splash ring generating means responsive to operation of said connecting means for actuating said interrupting means independently of said interval control means only for a single time period.

10. An automatic telephone system as defined in claim 9, wherein said ringing generator in each ringing control circuit is selectively connected by said interrupting means to said tip and ring leads through ring trip relay means responsive to connection across said tip and ring leads for disconnecting said interval control means from said interrupting means.

11. An automatic telephone system as defined in claim 7, wherein each ringing control circuit includes at least one ringing generator providing a ringing signal, connecting means for selectively connecting said ringing generator to one of said line circuits, interrupting means for selectively connecting said ringing generator to said connecting means, interval control means for actuating said interrupting means periodically for given time periods separated by intervals, and splash ring generating means responsive to operation of said connecting means for actuating said interrupting means independently of said interval control means only for a single time period.

12. An automatic telephone system as defined in claim 8, wherein each ringing control circuit includes a normally operated busy-free relay having contacts in said mark lead, said busy-free relay being connected to said sleeve lead so as to be released upon connection of ground thereto, thereby opening said mark lead to busy said ringing control.

13. An automatic telephone system comprising a plurality of line circuits, a line link network, a plurality of junctors, a trunk link network, common control means for effecting connection of one line circuit through said line link network, a junctor, said trunk link network and back through said line link network to another line circuit, and a plurality of ringing control circuits connected permanently in respective lines extending from said trunk link network to said line link network.

14. An automatic telephone system as defined in claim 13, wherein communication connections through said line link network and said trunk link network and said plurality of lines each include tip, ring, sleeve and mark leads, each ringing control circuit including at least one ringing generator providing a ringing signal, connecting means for selectively connecting said ringing generator across said tip and ring leads, interrupting means for selectively connecting said ringing generator to said connecting means, and interval control means for actuating said interrupting means periodically for given time periods separated by intervals.

15. An automatic telephone system as defined in claim 14, wherein each ringing control circuit further includes splash ring generating means responsive to operation of said connecting means for actuating said interrupting means independently of said interval control means only for a single time period.

16. An automatic telephone system as defined in claim 15, wherein each ringing control circuit includes a normally operated busy-free relay having contacts in said mark lead, said busy-free relay being connected to said sleeve lead so as to be released upon connection of ground thereto, thereby opening said mark lead to busy said ringing control.

17. An automatic telephone system as defined in claim 13, wherein each ringing control circuit includes at least one ringing generator providing a ringing signal, connecting means for selectively connecting said ringing generator to one of said line circuits, interrupting means for selectively connecting said ringing generator to said connecting means, interval control means for actuating said interrupting means periodically for given time periods separated by intervals, and splash ring generating means responsive to operation of said connecting means for actuating said interrupting means independently of said interval control means only for a single time period.

18. A ringing control for an automatic telephone system including a plurality of line circuits comprising at least one ringing generator providing a ringing signal, connecting means for selectively connecting said ringing generator to one of said line circuits, interrupting means for selectively connecting said ringing generator to said connecting means, interval control means for actuating said interrupting means periodically for given time periods separated by intervals, and splash ring generating means responsive to operation of said connecting means for actuating said interrupting means independently of said interval control means only for a single time period.

19. A ringing control as defined in claim 18, wherein said connecting means includes tip, ring, sleeve and mark leads extending to said one line circuit, said ringing generator being selectively connected by said interrupting means to said tip and ring leads through ring trip relay means responsive to connection across said tip and ring leads at said one line circuit for disconnecting said interval control means from said interrupting means.

20. A ringing control as defined in claim 19, further including a normally operated busy-free relay having contacts in said mark lead, said busy-free relay being connected to said sleeve lead so as to be released by the connection of ground thereto, thereby opening said mark lead to busy said ringing control.

* * * * *

UNITED STATES PATENT OFFICE
CERTIFICATE OF CORRECTION

PATENT NO. : 3,671,678

DATED : June 20, 1972

INVENTOR(S) : Otto Altenburger

It is certified that error appears in the above-identified patent and that said Letters Patent are hereby corrected as shown below:

Col. 2, line 22 "32a-32" should be ---32a-32n---.

Col. 5, line 14 "he" should be ---the---.

Signed and Sealed this

*twenty-first* Day of *October 1975*

[SEAL]

*Attest:*

RUTH C. MASON
*Attesting Officer*

C. MARSHALL DANN
*Commissioner of Patents and Trademarks*